United States Patent
Visseaux et al.

(10) Patent No.: US 11,634,519 B2
(45) Date of Patent: Apr. 25, 2023

(54) METHOD FOR FUNCTIONALISING A STEREO-REGULAR POLYDIENE

(71) Applicants: CENTRE NATIONAL DE LA RECHERCHE SCIENTIFIQUE, Paris (FR); UNIVERSITE D'ARTOIS, Arras (FR); UNIVERSITÉ DE LILLE, Lille (FR); ECOLE CENTRALE DE LILLE; ECOLE NATIONALE SUPERIEURE DE CHIMIE DE LILLE, Villeneuve d'Ascq (FR)

(72) Inventors: Marc Visseaux, Villeneuve d'Ascq (FR); Philippe Zinck, Villeneuve d'Ascq (FR); Sébastien Georges, Villeneuve d'Ascq (FR); Yohan Champouret, Villeneuve d'Ascq (FR)

(73) Assignees: CENTRE NATIONAL DE LA RECHERCHE SCIENTIFIQUE, Paris (FR); UNIVERSITE D'ARTOIS, Arras (FR); UNIVERSITÉ DE LILLE, Lille (FR); ECOLE CENTRALE DE LILLE, Villeneuve d'Ascq (FR); ECOLE NATIONALE SUPERIEURE DE CHIMIE DE LILLE, Villeneuve d'Ascq (FR)

( * ) Notice: Subject to any disclaimer, the term of this patent is extended or adjusted under 35 U.S.C. 154(b) by 388 days.

(21) Appl. No.: 16/630,205

(22) PCT Filed: Jul. 11, 2018

(86) PCT No.: PCT/EP2018/068839
§ 371 (c)(1),
(2) Date: Jan. 10, 2020

(87) PCT Pub. No.: WO2019/012009
PCT Pub. Date: Jan. 17, 2019

(65) Prior Publication Data
US 2020/0157259 A1    May 21, 2020

(51) Int. Cl.
| | | |
|---|---|---|
| *C08F 36/14* | (2006.01) | |
| *C08F 4/54* | (2006.01) | |
| *C08F 36/08* | (2006.01) | |
| *C08F 36/06* | (2006.01) | |
| *C08F 36/04* | (2006.01) | |
| *C08K 5/56* | (2006.01) | |

(52) U.S. Cl.
CPC .............. *C08F 36/14* (2013.01); *C08F 4/545* (2013.01); *C08F 36/06* (2013.01); *C08F 36/08* (2013.01); *C08F 36/045* (2013.01); *C08F 2438/00* (2013.01); *C08F 2810/40* (2013.01); *C08K 5/56* (2013.01)

(58) Field of Classification Search
CPC .......... C08F 36/14; C08F 4/545; C08F 36/06; C08F 36/08; C08F 2438/00; C08K 5/56
See application file for complete search history.

(56) References Cited

FOREIGN PATENT DOCUMENTS

| WO | 2010/139449 A1 | 12/2010 |
| WO | 2015/101477 A1 | 7/2015 |

OTHER PUBLICATIONS

Ventura et al., Trans-stereospecific polymerization of butadiene and random copolymerization with styrene using borohydrido neodymium/magnesium dialkyl catalysts, European Polymer Journal 49 (2013) 4130-4140. (Year: 2013).*

International Search Report, dated Sep. 21, 2018, from corresponding PCT application No. PCT/EP2018/068839.

French Search Report, dated Apr. 12, 2018, from corresponding French application No. 1756584.

Ventura et al.; Trans-stereospecific polymerization of butadiene and random copolymerization with styrene using borohydrido neodymium/magnesium dialkyl catalysts; European Polymer Journal; Dec. 1, 2013; pp. 4130-4140; vol. 49, No. 12.

* cited by examiner

*Primary Examiner* — Robert D Harlan
(74) *Attorney, Agent, or Firm* — Nixon & Vanderhye (57) ABSTRACT

Disclosed is a functionalizing method for the end functionalisation of trans-1,4 stereo-regular polydiene chains obtained by the coordination catalytic polymerisation of at least one conjugated diene monomer. It also relates to a polydiene having a trans-1,4 chain formation rate of at least 85%, preferably at least 90%, and an end functionalisation rate higher than 70%, preferably higher than 80%, and more preferably higher than 90%.

19 Claims, 1 Drawing Sheet

METHOD FOR FUNCTIONALISING A STEREO-REGULAR POLYDIENE

BACKGROUND OF THE INVENTION

Field of the Invention

The present invention relates mainly to a method that is effective for the end functionalisation of trans-1,4 (configuration) stereo-regular polydiene chains.

Description of the Related Art

Polydienes are mainly derived from the homopolymerisation or co-polymerisation of conjugated dienes. These polymerisations therefore, according to the conditions of implementation thereof and when the polymerisation takes place with a 1,4-regio-selectivity, are capable of generating polydiene chains with double bonds having cis-1,4 and/or trans-1,4 configuration. However, stereo-regularity has beneficial consequences on the properties of materials derived from these polydienes, and control thereof is therefore of great interest to manufacturers. Thus, it is advantageous to have a mode of synthesis of so-called stereo-regular polydienes, that is to say polydienes the microstructure of which is controlled in order for it to have a significant preponderance of either one of the cis-1,4 or trans-1,4 configurations, and in particular the trans-1,4 configuration.

Another prime focus of interest for the formulators of these polydienes is their functionalisation at the ends of chains. The presence of terminal functional groups in effect presents the advantage of making it possible to adjust their physico-chemical properties in particular in terms of adhesion, printability or affinity with other compounds, but also of enabling the development of polymers having a more elaborate architecture.

Quite obviously, the provision of a mode of synthesis that makes it possible to satisfy these two requirements at the same time would be particularly advantageous in the context of industrial application.

Polydiene synthesising methods have already been proposed for synthesising polydienes whereof the stereo-regularity is controlled. In particular, trans-1,4-polydienes can be synthesised by coordination catalytic polymerisation by making use of rare earth coordination catalysts. However, there is no attempt to consider functionalisation jointly therewith (M. Terrier et al., Journal of Polymer Science Part A, 2007, 45 (12), pp. 2400-2409).

Furthermore, different modes of functionalisation of polydienes have been described. For the most part, functionalisation has been considered with respect to diene polymers obtained by anionic or radical polymerisation (Heurtefeu et al., Polymer Chemistry, 2010, 1, pp. 1078-1085). However, the anionic and radical polymerisations do not serve to enable effective control of the stereo-regularity of the polydiene formed. Methods for functionalising 1,4-polyisoprenes have also been described in discontinuous or batch methods (Brosse et al., Journal of Applied Polymer Science, 78, pp. 1461-1477). Discontinuous batch methods are, however, not very advantageous in the industrial context given that they are neither sufficiently productive nor sufficiently economical.

Finally, the synthesis of cis-1,4 stereo-regular polyisoprene and polybutadiene by coordination polymerisation followed by a post-polymerisation reaction by means of a functionalising agent has already been envisaged, in particular in the patent document WO 2015/101477. However, such a method cannot be transposed to the synthesis of functionalised trans-1,4 stereo-regular polydienes.

Indeed, the synthesis of polydienes by coordination catalysis making use of a rare earth based catalytic system, in particular $Nd(BH_4)_3(THF)_3$, and comprising an excess amount of an organometallic compound based on a metal belonging to the $2^{nd}$ column or to the $13^{th}$ column of the periodic table has already been described in the patent document WO 2010/139449. However, in this case, the method does not satisfy the requirement of trans-1,4 stereo-regularity.

Therefore there continues to be a need for an effective method for accessing functionalised polydienes having rigorously controlled trans-1,4 stereo-regularity. In particular, there is a need to be able to access such polymers with a limited number of reaction steps in the interests of being competitive in respect of production on an industrial scale.

In addition to these requirements there are others that derive from an interest in advancing more ecologically responsible approaches. It is now an ongoing concern of manufacturers to favour, where possible, bio-sourced raw materials. In the present case, the terpenes discussed being natural diene compounds present a significant advantage in their ability to be considered as precursors of functionalised and stereo-regular diene polymers as envisaged according to the invention.

SUMMARY OF THE INVENTION

The object of the present invention is precisely to respond to all of these expectations.

Thus, according to a first aspect, the present invention relates to a functionalising method that is effective for the end functionalisation of trans-1,4 stereo-regular polydiene chains obtained by coordination catalytic polymerisation of at least one conjugated diene monomer, characterised in that the said method comprises at least the following steps;

a) providing a medium containing stereo-regular diene polymer chains formed in situ by means of coordination catalytic polymerisation of at least one conjugated diene monomer in the presence of a catalytic system that is effective in promoting trans-1,4 stereo-regular polymerisation of the said monomer;

b) introducing an excessive amount of at least one metal transfer agent, brought in contact with the said stereo-regular chains, and maintaining this contact under conditions conducive to the transfer thereof to the said metal transfer agent; and c) bringing the stereo-regular chains transferred to the said metal transfer agent, into contact with at least one functionalising agent, and maintaining this contact under effective conditions conducive to the formation of a trans-1,4 stereo-regular diene polymer functionalised at least at one of its terminal ends.

Figure 1:
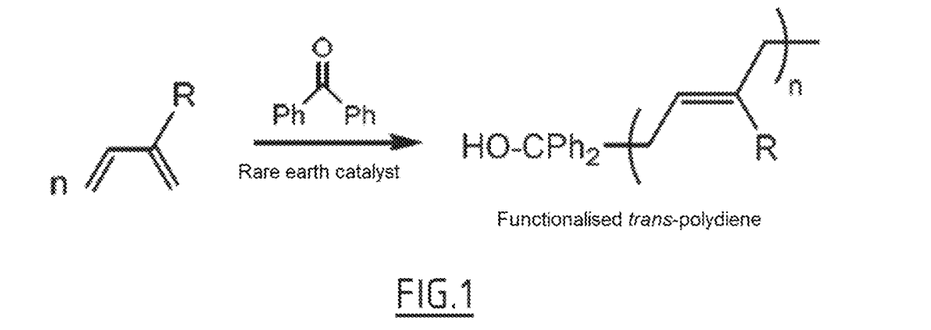
FIG. 1: Diagram representing the synthesis of a trans-stereo-regular polydiene, from conjugated diene monomers, and the functionalisation thereof at the end of the chain with a benzophenone functionalising agent, by means of a method according to the invention.

FIG. 1 schematically shows a synthesising method for the synthesis of a trans-stereo-regular polydiene according to the invention, that makes use of at least one conjugated diene monomer, a rare earth catalyst and benzophenone as a functionalising agent.

Advantageously, the polydiene obtained according to the method defined above has an end functionalisation rate that is higher than 70%, preferably higher than 80%, more preferentially higher than 90%, or indeed even higher than 95%.

According to one preferred variant embodiment, the coordination catalytic polymerisation is a coordinative chain transfer polymerisation process and the catalytic system comprises at least one metal catalyst and one alkylating agent, preferably in a molar ratio of the alkylating agent to catalyst of less than 5, preferably less than 3, and more preferentially equal to 1.

In an unexpected manner, the inventors have in fact found that it is possible to proceed efficiently in bringing about the end functionalisation of polydiene chains in the continuum of their development by polymerisation, subject to considering a specific mode of polymerisation, in this case by coordination catalysis, and the presence of a metal transfer agent in a quantity that is also pre-determined. In addition, the implementation of such a method does not require making use of an excess amount of alkylating agent while at the same time making possible a maximum alkylation rate.

Advantageously, the steps of polymerisation of stereo-regular diene polymer chains and of end functionalisation may be carried out in a single reaction medium ("one pot") with the proviso that a chain transfer step also be considered therein.

To the best of the inventors' knowledge, this combination of steps in the same reaction medium has never before been considered in order to access polydienes whereof the trans-1,4 stereo-regularity and end functionalisation are strictly controlled and therefore confers to the method according to the invention an advantageous reproducible aspect which is of particular interest from an industrial point of view.

This method is also very particularly advantageous in that it makes it possible to dispense with a subsequent step of post-reacting of the polymer on a functionalising agent.

Advantageously, steps a) to c) of the method according to the invention are carried out in a continuous process. This embodiment is particularly beneficial in that it provides for a simpler and more economical implementation of the method, in particular because it can be carried out in a single reactor.

Furthermore, the inventors have also found that a method according to the invention is suitable for the preparation of functionalised trans-1,4 stereo-regular polydienes from dienes derived from biomass such as certain terpenes, in particular myrcene, ocimene, farnesene and the mixtures thereof.

This embodiment is of particularly beneficial interest both from the industrial and environmental perspectives.

According to one preferred variant embodiment of the invention, the diene polymer chains considered in step a) have a high degree of trans-1,4 stereo-regularity that is higher than 85%, preferably higher than 90%, more preferentially higher than 95%.

Such trans-1,4 stereo-regular diene polymers have the particularity of being crystalline at ambient temperature and therefore serve the purpose of providing rigidity in the materials thus formed.

The selection of the catalytic system is a determinating factor in promoting this trans-1,4 stereo-regularity.

Thus, according to a preferred variant embodiment, the catalytic system of the step a) comprises a rare earth catalyst/alkylating agent pair selected from $Ln(BH_4)_3(THF)_3/BEM$, $C_5Me_5Ln(BH_4)_2(THF)_2/BEM$, $LnCl_3(THF)_3/BEM$. Advantageously, it is a catalyst $Nd(BH_4)_3(THF)_3$ [neodymium trisborohydride tetrahydrofuran] combined with an alkylating agent butylethylmagnesium in a molar ratio in relation to the neodymium of less than 5.

According to an advantageous variant embodiment, the diene polymer chains considered in step a) are polyisoprene chains having a trans-1,4 stereo-regularity; the catalytic system used in the implementation of step a) comprises a catalyst $Nd(BH_4)_3(THF)_3$ combined with an alkylating agent butylethylmagnesium in a molar ratio in relation to neodymium that is equal to 1; and the metal chain transfer agent used in the implementation of step b) is butylethylmagnesium, in a molar ratio in relation to neodymium that is at least equal to 5, or n-butyllithium in a molar ratio in relation to neodymium that is at least equal to 5, preferably at least equal to 10, or methyllithium in a molar ratio in relation to neodymium that is at least equal to 5.

According to another of its aspects, the present invention relates to a polydiene having a trans-1,4 chain formation rate of at least 85%, preferably at least 90%, and an end functionalisation rate that is higher than 70%, preferably higher than 80%, more preferentially higher than 90%, or indeed even higher than 95%.

DETAILED DESCRIPTION OF THE INVENTION

The term "conjugated diene monomer" according to the invention is understood to refer to a hydrocarbon containing at least two conjugated double bonds.

The term "stereo-regular polydiene" according to the invention is understood to refer to a polydiene having a trans-1,4 chain formation rate of at least 85%, preferably at least 90%, more preferentially at least 95%.

The term "functionalised polydiene" according to the invention is understood to refer to a polydiene whose end functionalisation rate is higher than 70%, preferably higher than 80%, more preferentially higher than 90%, or indeed even higher than 95%.

The term "end functionalisation rate" according to the invention, is used to characterise the molar quantity of terminal ends of functionalised chains relative to the molar quantity of terminal ends of chains in the absence of functionalisation.

The term "terminal end" according to the invention is understood to refer to the free ends of a polydiene chain.

Method According to the Invention

The first step of the method requires providing for a medium containing stereo-regular polydiene chains, that is to say the rate of chain formation of trans-1,4 double bonds is at least 85%, preferably at least 90%, more preferentially at least 95%.

Advantageously, these chains are generated in situ in this medium by means of coordination catalytic polymerisation of at least one conjugated diene monomer in the presence of an effective catalytic system in order to promote a trans-1,4 stereo-regular polymerisation of the said monomer.

a) Step of Coordination Catalytic Polymerisation

Coordination catalytic polymerisation is a type of chain polymerisation in which the initiation is brought about thanks to a complex coordination catalyst and the propagation is brought about at an active centre which is an organometallic complex between the monomer and the metal, that is to say the said organometallic complex comprising at least one metal-carbon bond.

Such a coordination catalysis polymerisation step makes use in implementation of at least one conjugated diene monomer. A method according to the invention therefore makes possible the synthesis of diene homo-polymers and co-polymers.

Monomers

In a general manner, all of the conjugated dienes conventionally considered for preparing polydienes may be considered in the method of the invention.

By way of illustrative and non-limiting example of these conjugated dienes mention may be made in particular of 1,3-butadiene, 2,3-di($C_1$-$C_5$ alkyl) 1,3-butadienes, substituted 1,3-butadienes, such as isoprene, di-, tri- or tetra-1,3 pentadienes, 1,3-hexadiene, 2,4-hexadiene, terpenes or any other conjugated diene comprising between 4 and 8 carbon atoms and the mixtures thereof.

Preferably, the one or more monomer(s) used in implementing a method according to the invention may be selected from terpenes which have the advantage of being raw materials that are readily available, and used in various industrial applications.

In addition, these compounds can be directly extracted from plants and are therefore generally bio-sourced.

The preferred terpenes are myrcene, ocimene, farnesene and the mixtures thereof, more preferentially myrcene.

The terpenes may also be co-polymerised with any other conjugated diene, preferably with isoprene.

Preferably the one or more monomer(s) is(are) selected from isoprene, myrcene and the mixtures thereof.

This (these) one or more diene monomer(s) may also be co-polymerised with other monomers commonly used in the field of polymers, for example styrene, methylstyrene, divinylbenzene, ethylene and alpha-olefins, in a manner so as to constitute statistical or block chains.

Advantageously, a method according to the invention makes use in implementation of at least one monomer and at least one catalyst in a molar ratio of the one or more monomer(s) relative to the catalyst ranging from 20 to 2000, preferably from 20 to 1000, even more preferentially from 50 to 200.

Catalyst

As stated previously, it is possible, through the selection of the catalyst, to direct the polymerisation to a trans-1,4 stereo regularity in accordance with the invention.

The selection of the catalyst clearly falls within the scope of knowledge and expertise of a person skilled in the art, with the aim of directing the polymerisation towards a trans-1,4 stereo regularity in accordance with the invention.

Thus, the catalyst considered according to the invention may be a rare earth catalyst having the formula:

$(CpR)_m RE(A)_{3-m}(B)_n$, in which:

RE is a rare earth metal, preferably a Lanthanide;

each unit A, whether identical or different, is independently selected from among halides, carboxylates, organophosphates, alcoholates, phenates, amides, alkyls, alkoxys, allyls, borohydrides or the mono- or di-substituted derivatives thereof;

each unit B, whether identical or different, represents a molecule of solvent complexed on the rare earth metal;

CpR represents a cyclopentadienyl having the formula , with an integer comprised between 0 and 5, or one of its derivatives, m represents 0 or 1; and n is an integer comprised between 0 and 3.

Preferably A is a borohydride.

Preferably m is equal to 0 and n is equal to 3.

A preferred lanthanide according to the invention is neodymium.

The catalyst is advantageously selected from among the compounds having the formula $Ln(BH_4)_3(THF)_3$, $CpLn(BH_4)_2(THF)_2$, such as $C_5Me_5Ln(BH_4)_2(THF)_2$, and $LnCl_3(THF)_3$.

A preferred catalyst according to the invention is the compound having the formula $Nd(BH_4)_3(THF)_3$.

The catalysts considered according to the invention can be prepared by any method known to the person skilled in the art. In particular, the rare earth salts may be prepared according to the methods described in patent document WO 02/38636.

Other synthesis routes are described, in particular in the paper by S Cendrowski-Guillaume, M. Nierlich, M. Lance, M. Ephritikhine, Organometallics, 1998, 17, 786. For example, the catalyst $Ln(BH_4)_3(THF)_3$ can be synthesised by reacting lanthanide trichloride with an excess of sodium borohydride (20%) in THF.

According to a particularly advantageous embodiment of the invention, the stereo-regular diene polymer chains considered according to the invention are formed in situ by means of coordinative chain transfer polymerisation.

Coordinative chain transfer polymerisation is a coordination polymerisation process that serves to enable the growth of multiple chains per unit of catalyst. This method involves a balance between the chains growing on the metal of the catalyst and the chains bearing a metal transfer agent at the terminal end of the chain.

Thus, this embodiment is advantageous in that it serves to enable the growth of multiple polymer chains from one catalyst molecule, and therefore the use of a reduced amount of catalyst.

According to this embodiment of the invention, the catalytic system comprises a metal catalyst as defined above and an alkylating agent.

Alkylating Agent

The alkylating agent considered in the context of the present invention may be selected from the compounds having the formula:

in which:

M is selected from among alkali metals, alkaline earth metals, transition metals or metals from column 13 of the periodic table of elements;

each R, whether identical or different, independently represents a linear or branched ($C_1$-$C_{10}$)alkyl group, optionally comprising one or more unsaturations, or each R forming with the metal a $C_3$-$C_{10}$ ring;

X represents a halogen atom;

p is an integer equal to 0, 1 or 2;

q is an integer defined according to the valence of the metal considered; and r is an integer that is greater than or equal to 1.

Preferably M is an alkaline earth metal, such as magnesium, or an aluminum.

Preferably, X is a chlorine atom, in particular when M is an aluminum.

The alkylating agent may thus be selected from the alkyllithiums, dialkylmagnesiums, trialkylaluminiums, dialkylzincs, dialkylhalides or organomagnesiums.

Advantageously, the alkylating agent is selected from among dialkylmagnesiums, alkyllithiums and trialkylaluminiums, preferably it is butylethylmagnesium.

The alkylating agent considered according to the invention may also be bifunctional. Thus, the alkylating agent may be selected from among the compounds having the formula (MgIsoprenyl)$_n$, (MgButadienyl)$_n$, (MgMyrcenyl)$_n$ or be a cyclic magnesium such as magnesium cyclopentane Mg (CH$_2$)$_5$.

A bifunctional alkylating agent according to this embodiment serves the purpose of promoting functionalisation at the two ends of each stereo-regular polydiene chain according to the invention. Thus, this embodiment makes possible the synthesis of telechelic stereo-regular polydienes.

The alkylating agent considered according to the invention may be synthesised by any suitable method known to the person skilled in the art. For example, when the alkylating agent is bifunctional, it may be synthesised according to the method described in the paper by H. Yasuda et al., Macromolecules, 1978, 11, 586.

According to one particular embodiment of the invention, the catalytic system comprises a rare earth catalyst having the formula (CpR)$_m$RE(A)$_{3-m}$(B)$_n$ in which CpR, RE, A, B, m and n are as defined here above, in combination with an alkylating agent having the formula (MR$_q$X$_p$)$_r$ in which M, R, X, q, p and r are as defined here above.

According to one particular embodiment of the invention, the catalytic system considered in step a) comprises a rare earth catalyst/alkylating agent pair selected from among Ln(BH$_4$)$_3$(THF)$_3$/BEM, CpRLn(BH$_4$)$_2$(THF)$_2$/BEM, such as C$_5$Me$_5$Ln(BH$_4$)$_2$(THF)$_2$/BEM, LnCl$_3$(THF)$_3$/BEM, and preferably comprises a catalyst Nd(BH$_4$)$_3$(THF)$_3$ [neodymium trisborohydride tetrahydrofuran] and an alkylating agent butylethylmagnesium in a molar ratio in relation to the neodymium of less than 5.

In particular, the diene polymer chains considered in the step a) are polyisoprene chains and the step a) makes use in implementation by way of a catalytic system, of a catalyst Nd(BH$_4$)$_3$(THF)$_3$ and an alkylating agent butylethylmagnesium in a molar ratio in relation to the neodymium equal to 1, and the step b) makes use in implementation by way of a metal chain transfer agent, of butylethylmagnesium, in a molar ratio in relation to the neodymium that is at least equal to 5 or n-butyllithium in a molar ratio in relation to the neodymium that is at least equal to 5, preferably at least equal to 10, or methyllithium in a molar ratio in relation to the neodymium that is at least equal to 5.

In a particularly advantageous manner, the catalytic system according to the invention comprises an alkylating agent in a molar ratio of less than 5, relative to the metal catalyst considered for the polymerisation in situ. Preferably, the molar ratio of an alkylating agent to the metal catalyst is less than 3 and more preferentially is equal to 1.

The operating conditions considered for the polymerisation are the usual conditions and adjustment thereof clearly falls within the scope of knowledge and expertise of a person skilled in the art.

The polymerisation, in particular chain transfer coordinative polymerisation, may be carried out in a solvent medium, under an inert atmosphere, for example under argon and at a temperature varying from 30° C. to 100° C., preferably from 40° C. to 60° C., and may be completed within a period of at least 60 minutes, preferably at least 2 hours, for example at least 4 hours.

In particular, the time period of the polymerisation reaction lasting at least 60 minutes, preferably at least 2 hours, for example at least 4 hours, makes it possible to ensure the complete conversion into monomer.

Indeed, the trans-1,4 stereo-regular polydiene corresponds to the thermodynamic isomer as compared to the cis-1,4 stereo-regular polydiene which is the kinetic isomer. Thus, a longer polymerisation reaction time makes it possible to ensure the complete conversion to trans-1,4 stereo-regular polydiene.

In an advantageous manner, the steps a) to c) of the method are carried out in a volatile organic solvent, in particular selected from among toluene, cyclohexane, methylcyclohexane, heptane, mesitylene, cumene and the mixtures thereof, and preferably toluene.

As is apparent from the above section/s, the method according to the invention presents the advantage of being able to be carried out in a continuous process and in one single receptacle or indeed even a reactor, with this being thanks to the use in implementation of polydiene chains that are said to be "transferred" to a metal transfer agent for the functionalisation stage.

According to one preferred embodiment, the catalytic system according to the invention comprises a magnesium, in particular a dialkylmagnesium, by way of an alkylating agent.

b) Chain Transfer Step

During this chain transfer stage, the terminal ends of the stereo-regular diene polymer chains are transferred from the metal of the catalyst to a metal transfer agent.

This transfer results in the binding of the transfer agent to the terminal ends of the stereo-regular chains.

This chain transfer step therefore involves bringing into contact the stereo-regular chains deriving from the coordination catalytic polymerisation, in the presence of an excessive amount of at least one metal transfer agent.

The transfer at the level of the polydiene chains, from the catalyst to the metal transfer agent, is advantageous in that it makes it possible to achieve very high end functionalisation rates. In fact, the reactivity of the ends of the polydiene chains bonded to a transfer agent according to the invention, with respect to the functionalising agent, is greater than the reactivity of the said ends when they are bonded to the catalyst.

Metal Transfer Agent

In particular, the quantity of metal transfer agent is adjusted in order to ensure that the transfer equilibrium is completely shifted towards the formation of polydiene-'transfer-agent-metal' species, and that the molar proportion of terminal ends of chains transferred to the transfer agent in relation to the total molar amount of terminal ends of chains is thus between 70% and 100%, and preferably is higher than 90%.

An excessive amount of metal transfer agent corresponds to a transfer agent content that is higher than the content of polymerisation catalyst.

In particular, the molar ratio of alkyl originating from the metal transfer agent relative to the catalyst is at least equal to 5, and preferably at least equal to 10, or indeed even at least equal to 20.

Preferably, the metal transfer agent considered according to the invention is selected from among the compounds having the formula:

in which:

M' is an alkali metal, an alkaline earth metal, or a metal from column 13 of the periodic table of elements;

each R independently represents a linear or branched $C_1$-$C_{10}$ alkyl group, optionally comprising one or more unsaturations;

X represents a halogen atom;

s is an integer equal to 0 or 1; and x is an integer defined according to the valence of the metal considered.

Preferably, s is equal to 0.

In a particularly advantageous manner, the metal transfer agent considered according to the invention is selected from among the dialkylmagnesiums, alkyllithiums and trialkylaluminums, preferably from butylethylmagnesium, n-butyllithium, methyllithium, triisobutylaluminium and triethylaluminium.

In the method according to the invention, the contact between the stereo-regular chains deriving from the coordination catalytic polymerisation and the excessive quantity of at least one metal transfer agent is maintained under conditions that are favourable to the transfer thereof to the said metal transfer agent.

Optimisation of the duration of maintaining contact and of the conditions conducive to chain transfer in order to carry out the transfer of stereo-regular chains to the metal transfer agent clearly falls within the scope of knowledge and expertise of the person skilled in the art.

The contact considered in the step b) advantageously may be maintained for a period of at least 60 minutes, preferably for at least 2 hours, for example at least 4 hours, following the introduction of the excessive amount of metal transfer agent.

In similar fashion, the step b) is advantageously carried out at a temperature comprised between 0° C. and 100° C., preferably between 20° C. and 80° C., more preferentially between 40° C. and 60° C.

In a particularly advantageous manner, the step b) according to the invention is carried out at a temperature comprised between 0° C. and 100° C., preferably between 20° C. and 80° C., more preferentially between 40° C. and 60° C., and maintained for a period of at least 60 minutes, preferably at least 2 hours, for example at least 4 hours.

According to one particular embodiment of the invention, the step b) of transfer to the metal transfer agent takes place consecutively to the step a) of coordination catalytic polymerisation of at least one conjugated diene monomer.

This embodiment is most particularly illustrated by Examples 5 to 10 here below. This embodiment is particularly advantageous in that it makes it possible to obtain particularly high functionalisation rates.

According to this embodiment, the metal transfer agent is added after the step a) of polymerisation. The metal transfer agent may be identical to or different from the alkylating agent of the catalytic system as defined here above.

In particular, the metal transfer agent may be identical to the alkylating agent of the catalytic system as defined here above. Preferably, according to this embodiment, the metal transfer agent is selected from the dialkylmagnesiums, and is in particular butylethylmagnesium.

According to one embodiment, the alkylating agent of the catalytic system is selected from the dialkylmagnesiums, and is in particular butylethylmagnesium, and the metal transfer agent is also selected from the dialkylmagnesiums, and is in particular butylethylmagnesium.

In particular, the metal transfer agent may be different from the alkylating agent of the catalytic system as defined here above. Preferably, according to this embodiment, the metal transfer agent is selected from the alkyllithiums and more particularly from n-butyllithium or methyllithium.

According to one embodiment, the alkylating agent of the catalytic system is selected from the dialkylmagnesiums, and is in particular butylethylmagnesium, and the metal transfer agent is also selected from the alkyllithiums and more particularly from n-butyllithium or methyllithium.

Thus, the transfer agent is added in an excess amount when the conversion into monomer is at a maximum or complete, that is to say after a polymerisation reaction time period of at least 60 minutes, preferably at least 2 hours, for example at least 4 hours.

According to this embodiment, the metal transfer agent may be identical to or different from the alkylating agent defined here above. In particular, the alkylating agent may be selected from among dialkylmagnesiums, alkyllithiums, trialkylaluminiums and compounds having the formulas $(MgIsoprenyl)_n$, $(MgButadienyl)_n$ aNd $(MgMyrcenyl)_n$, and the transfer agent may be selected from among dialkylmagnesiums, alkyllithiums and trialkylaluminiums. Preferably, it is an alkylating agent/transfer agent pair comprising of butylethylmagnesium/butylethylmagnesium, butylethylmagnesium/n-butyllithium, butylethylmagnesium/methyllithium, $(MgIsoprenyl)_n$/n-butyllithium or $(MgIsoprenyl)_n$/methyllithium.

When it is identical to the alkylating agent considered during the polymerisation step, bringing the polydiene chains into contact with the said metal transfer agent requires an adjustment of the amount of this transfer agent within the reactor in order to access the excess necessary for the proper conduct of the transfer reaction, carried out at the end of the polymerisation process considered in step a), that is to say when the conversion into monomer is at a maximum or complete. For this, it is advantageous for the polymerisation reaction considered in step a) to be carried out for a period of at least 60 minutes, preferably at least 2 hours, for example at least 4 hours before adjusting the amount of transfer agent.

Thus, in an advantageous manner according to this embodiment, the metal transfer agent is identical to the alkylating agent and the step b) is carried out consecutively to the step a).

According to another particular embodiment of the invention, the generation of "transferred" polydiene chains considered in step b) may be carried out simultaneously with the polymerisation process carried out in step a).

Thus, the transfer agent is added, in an excess amount, from the start of the coordination catalytic polymerisation of at least one conjugated diene monomer considered in the step a).

This embodiment is particularly illustrated by Examples 3 and 4 below.

In particular, the metal transfer agent may be different from the alkylating agent of the catalytic system as defined here above. Preferably, according to this embodiment, the metal transfer agent is selected from the trialkylaluminiums and more particularly is triethylaluminium.

According to one embodiment, the alkylating agent of the catalytic system is selected from the dialkylmagnesiums, and is in particular butylethylmagnesium, and the metal transfer agent is also selected from the trialkylaluminiums.

Thus, the steps a) and b) may be carried out simultaneously and the metal transfer agent may be present during the polymerisation of the stereo-regular chains. The reactor considered in step a) then contains the chains growing on the metal of the catalyst, the not yet polymerised monomer, the polydiene chains already transferred and in the process of being transferred to the metal of the transfer agent.

According to this embodiment, the metal transfer agent is different from the alkylating agent defined here above. In particular, the alkylating agent is selected from among compounds having the formula $(MR_qX_p)_r$ as defined here above in which M represents a magnesium, and the metal transfer agent is selected from among compounds having the formula $M'R_xX_s$, in which M' represents an aluminum. Preferably the alkylating agent is a trialkylmagnesium and the transfer agent is a trialkylaluminum, more preferentially it is an alkylating agent/transfer agent pair comprising of butylethylmagnesium/triethylaluminum or butylethylaluminum/triisobutylaluminum.

Thus, in an advantageous manner according to this embodiment, the alkylating agent is introduced in an excess amount from the start of the polymerisation in situ, the alkylating agent is a dialkylmagnesium and the metal transfer agent is a trialkylaluminum.

This embodiment is quite particularly surprising since it is known that the presence of an organometallic compound based on a divalent or trivalent metal in an excess amount from the start of the coordination catalytic polymerisation of conjugated dienes does not serve the purpose of achieving the desired trans-1,4 stereo regularity according to the present invention (WO2010/139449).

c) Functionalisation Step

A method according to the invention comprises a contacting step of bringing the stereo-regular chains, transferred to the metal transfer agent, into contact with at least one functionalising agent.

In order to do this, a functionalising agent is added to the reaction mixture comprising the stereo-regular chains transferred to the metal transfer agent.

This functionalisation is preferably carried out consecutive to the completion of the transfer process, in particular so as to obtain polydiene chains of the same size.

The functionalising agent may be any compound containing a group that is capable of reacting on at least one of the anionic living terminal ends bonded to a metal of a stereo-regular chain.

The selection of this functionalising agent is obviously conditioned by the modification sought at the level of the polydiene chain. The trans-stereo-regular polydienes are apolar polymers. The functionalising agent may thus be selected so as to provide the chain ends of the polydiene with a polar character.

Making this selection clearly falls within the scope of knowledge and expertise of a person skilled in the art.

In particular, the functionalising agent may be selected from among derivatives of carboxylic acids, ketones, aldehydes, esters, imidazolidinones, isocyanates, nitriles, epoxies, imines, amides, cyclic amines, siloxanes, phosphates, organosulfur compounds, dihalogens, carbamates, thiocarbamates, urea compounds, carbonates, lactones, carbon oxides and dioxygen.

In a preferred manner, it is an electrophilic compound, more particularly selected from among benzophenone, 4-(N,N-dimethylamino)benzophenone, epoxies and alkoxysilanes.

The molar ratio of the functionalising agent to the catalyst may be greater than 10 and preferably varies from 20 to 40.

According to an advantageous embodiment of the invention, the step c) of the method is also carried out in the presence of a Lewis base, in particular selected from an ether or an amino compound, preferably tetrahydrofuran.

This embodiment is advantageous in that the presence of a Lewis base makes it possible to increase (and facilitate) the functionalisation rate of the polydiene resulting from the method.

In a method according to the invention, the contact between the stereo-regular chains transferred to the metal chain transfer agent and the functionalising agent is maintained under effective conditions conducive to the formation of a stereo-regular diene polymer functionalised at least at one of its terminal ends. The optimising of these conditions clearly falls within the scope of knowledge and expertise of a person skilled in the art.

The step c) is generally carried out over a period of between 1 hour and 12 hours, for example in at least 2 hours, at least 5 hours, or indeed at least 10 hours, following the introduction of the functionalising agent.

It is advantageously carried out at a temperature comprised between 0° C. and 100° C., preferably between 20° C. and 80° C., more preferentially between 40° C. and 60° C.

Thus, in a particularly advantageous manner, the step c) according to the invention is carried out at a temperature comprised between 0° C. and 100° C., preferably between 20° C. and 80° C., more preferentially between 40° C. and 60° C. and is maintained for a period of between 1 hour and 12 hours.

d) Termination of the Method:

A method according to the invention may optionally further comprise a step of termination.

Such a step is carried out after the step c) of the method defined here above.

This termination is the conventional termination in the synthesis of polymers and may be carried out according to any method known to the person skilled in the art. For example, termination can be accomplished by adding acidified methanol.

The polydiene formed can then be recovered according to any suitable method known to the person skilled in the art. For example, the recovery of polydiene can be carried out by means of precipitation in methanol.

Polydiene According to the Invention

The present invention also relates to a polydiene having a trans-1,4 chain formation rate of at least 85%, preferably at least 90%, and an end functionalisation rate that is higher than 70%, preferably higher than 80%, more preferentially higher than 90%.

In particular, a polydiene according to the invention derives from the coordination catalytic polymerisation of at least one conjugated diene monomer. Thus, a polydiene according to the invention can be a homo- or a co-polydiene.

Preferably, the one or more conjugated diene monomer(s) is (are) selected from among 1,3-butadiene, 2,3-di($C_1$-$C_5$ alkyl) 1,3-butadienes, substituted 1,3-butadienes, such as isoprene, di-, tri- or tetra-1,3 pentadienes, 1,3-hexadiene, 2,4-hexadiene, terpenes or any other conjugated diene comprising between 4 and 8 carbon atoms and the mixtures thereof.

The preferred terpenes are myrcene, ocimene, farnesene and the mixtures thereof, more preferentially myrcene.

The terpenes may also be co-polymerised with any other conjugated diene, preferably with isoprene.

Preferably the one or more monomer(s) is(are) selected from isoprene, myrcene and the mixtures thereof.

This (these) type(s) of monomer(s) may also be co-polymerised with other monomers commonly used in the field of polymers, for example styrene, methylstyrene, divinylbenzene, ethylene and alpha-olefins, in a manner so as to constitute statistical or block chains.

The polydienes according to the invention are additionally also functionalised.

They may be mono-functionalised, that is to say that only one of the two terminal ends of the polydiene is functionalised, or telechelic, that is to say that the two terminal ends of the polydiene are functionalised.

According to one advantageous embodiment of the invention, the polydiene is telechelic. In particular, at least 80%, preferably at least 90% of the polydiene chains are functionalised at their two terminal ends.

Preferably, the end functionalisation of a polydiene according to the invention consists of a unit selected from among the carboxylic acid, aldehyde, carbonate, epoxy, alcohol, amine, nitrile, imine, amide, carbamate, thiocarbamate, hydroperoxide, phosphate, silanol, halide, and thiol groups.

Preferably, the terminal function is selected from the hydroxydiphenyl, epoxy and silanol functions.

In a particularly advantageous manner, a polydiene according to the invention is a homopolymer or co-polymer of isoprene, myrcene, butadiene, and the substituted derivatives thereof, of oximene or farnesene mono-functionalised or telechelic at the terminal position and preferably by at least one hydroxydiphenyl function.

The present invention also relates to any polydiene obtained according to a method in accordance with the invention and as defined here above.

Applications

A polydiene according to the invention advantageously has good mechanical properties, that enable in particular use thereof in the manufacture of high performance tires.

A polydiene according to the invention also proves to be useful as a compatibilising agent, in particular in admixture with inorganic fillers, for example silica-based fillers, in particular in the tire industry.

A polydiene according to the invention also makes possible the development of polymers having more elaborate architecture, in particular the synthesis of grafted polymers, as macromonomer synthons.

A polydiene according to the invention can also be used as adhesion promoter or to improve the coverage of a paint when it is incorporated as an additive in a polymer formulation.

The examples here below are presented purely by way of not limiting illustration of the domain of the invention.

Measurement Methods

Microstructure:

The microstructure is determined based on the Nuclear Magnetic Resonance

NMR spectrum ($^1$H 400.33 MHz, $^{13}$C 100.66 MHz) obtained on a Bruker Avance II 400 device (9.4 T) equipped with a 5 mm TBI inverse probe at ambient temperature in $C_2D_2Cl_4$ with calibration on the residual solvent resonances δ=5.91 ppm ($^1$H) and 74.0 ppm ($^{13}$C).

Functionalisation.

Functionalisation is empirically demonstrated and quantified by NMR $^1$H and $^{13}$O on a Bruker Avance II 400 device (9.4 T) equipped with a 5 mm TBI inverse probe at ambient temperature in $C_2D_2Cl_4$, by integrating the aromatic signal from the chain end. Analysis by DOSY (Diffusion ordered spectroscopy) NMR (pulse programme ledbpgp2s) confirms the grafting of the function, which is a hydroxydiphenylmethylenyl function in the case of the following examples.

Figure 2:
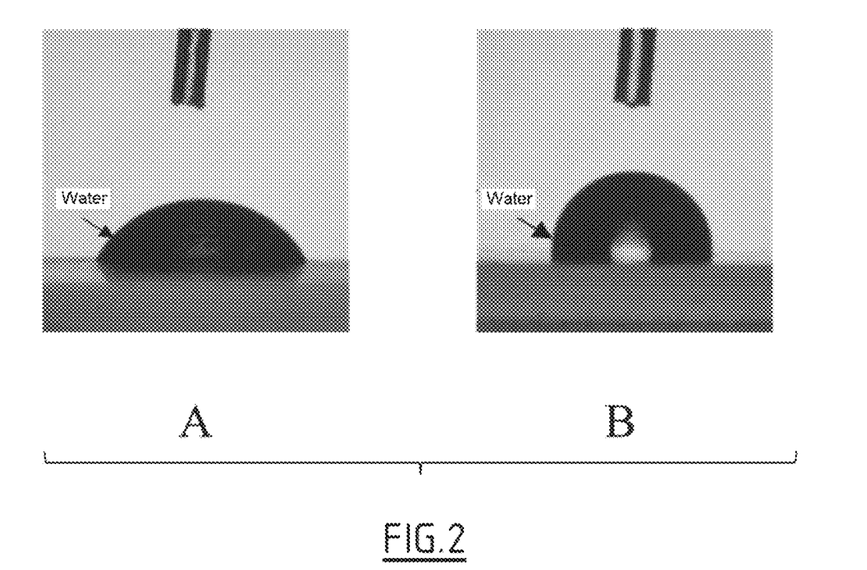
FIG. 2: Photos representing a drop of water deposited on a substrate covered with a trans-stereo-regular polyisoprene film functionalised with a polar functionalising agent according to the invention (A), and on a substrate covered with a trans-stereo-regular polyisoprene film that is not functionalised (B).

The polar character of the functionalised polydienes is empirically demonstrated by measuring the contact angle by using water as a reference, by means of the Digidrop Contact Angle Meter (GBX Scientific Instruments) and the software Windrop ++. The contact angle is measured (average of 5 experiments) by making use of a 10 μL drop of water deposited on a glass substrate covered with a polymer film. The said polymer film is itself prepared by evaporation of a polymer solution according to the invention (50 mg of polymer/1 ml) in toluene. As illustrated in FIG. 2, the comparison of the contact angle thus measured with that obtained on a surface covered by a reference non-functionalised trans-1,4 polyisoprene empirically demonstrates the more polar character of the stereo-regular polydiene functionalised by benzophenone according to the invention.

Molar Mass and Dispersity:

The molar mass and dispersity are measured by steric exclusion chromatography (SEC) in THF at 40° C. The apparatus used is a Waters chromatograph equipped with Styragel columns (HR2, HR3, HR5 and HRSE), and calibrated by reference to polystyrene calibration standards. This method effectively enables a separation of the polymer chains according to their size.

Polymer Yield:

The polymer yield is determined by means of gravimetry.

EXAMPLES

All of the syntheses are carried out under argon.

Material.

Isoprene and myrcene from Sigma Aldrich.

n-BuLi at 2.1 M in hexane from Sigma Aldrich or 2 M in cyclohexane from Sigma-Aldrich or MeLi at 1.6 M in diethyl ether from Sigma-Aldrich.

20% BEM in heptane from Texas Alkyls

Al(i-Bu)$_3$ and AlEt$_3$ from Sigma Aldrich.

Magnesium/isoprene adduct of type [Mg$(C_5H_8)_n$.2THF]$_m$ comprising 80% of [Mg$(C_5H_8)$.2THF]$_n$ and 20% of [Mg$(C_{10}H_{16})$.2THF]$_n$, prepared according to the procedure described in the published paper by H. Yasuda, Y. Nakano, K. Natsukawa, H. Tani, Macromolecules, 1978, 11, 586.

Example 1 (Control): Synthesis of Hydroxydiphenylmethylenyl-Trans-Polyisoprene without Chain Transfer Agent The trans-1,4 polyisoprene chains are obtained by polymerisation of isoprene (231 mg, or 3.40 mmol) in toluene with as catalyst Nd(BH$_4$)$_3$(THF)$_3$ in combination with butylethyl magnesium (BEM) by way of an alkylating agent (at 17 μmol of Nd) for 2 hours at 50° C. The isoprene/Nd molar ratio is 200. Then, 4 equivalents/Nd of benzophenone are added to the reaction mixture to react for a period of 12 hrs at 50° C. The termination is carried out by adding acidified methanol.

The polymer is recovered by precipitation in methanol containing BHT (bis tert-Butyl Hydroxy Toluene) as stabiliser.

Example 2 (Control): Synthesis of Hydroxydiphénylméthylényl-trans-polymyrcene without Transfer Agent A synthesis process corresponding to the protocol of Example 1 was carried out, using myrcene as a monomer in place of isoprene.

Example 3: Synthesis of Hydroxydiphenylmethylenyl-trans-polyisoprene and the Functionalisation Thereof According to the Invention The trans-1,4 polyisoprene chains are obtained by polymerisation of isoprene (680 mg, that is to say 10 mmol) in toluene with the catalytic system comprising of $Nd(BH_4)_3(THF)_3/BEM/AlEt_3$ (at 10 µmol of Nd and Mg and 90 µmol of Al) for a period of 24 hrs at 50° C. The isoprene/Nd molar ratio is 1000. Thereafter, 2 equivalents of benzophenone/alkyl (106 mg) are added to the reaction mixture and mixed for a period of 12 hrs at 50° C. The polymer is recovered according to the same protocol as in Example

Example 4: Synthesis of Hydroxydiphenylmethylenyl-trans-polymyrcene and the Functionalisation Thereof According to the Invention A synthesis process corresponding to the protocol of Example 3 was carried out, using a catalytic system comprising of $Nd(BH_4)_3(THF)_3/BEM/AliBu_3$ (with an Al/Nd molar ratio equal to 19) and myrcene in place of isoprene. The mixture is left to polymerise for a period of 72 hours at 50° C. In addition, the myrcene/Nd molar ratio is 200.

Example 5: Synthesis of Hydroxydiphenylmethylenyl-trans-polyisoprene and the Functionalisation Thereof According to the Invention A standard polymerisation is carried out according to the protocol of Example 1. When a complete conversion to monomer is achieved, an excess amount of BEM (10× equivalent Nd) is added to the reaction mixture and then the mixture is stirred for a period of 1 hr at 50° C. 2 equivalents/alkyl (60 mg) of benzophenone are added to the reaction mixture and then mixed for a period of 12 hrs at 50° C. The polymer is recovered according to the same protocol as in Example 1.

Example 6: Synthesis of Hydroxydiphenylmethylenyl-trans-polymyrcene and the Functionalisation Thereof According to the Invention A synthesis process corresponding to the protocol of Example 5 was carried out, using myrcene in place of isoprene.

Example 7: Synthesis of Hydroxydiphenylmethylenyl-trans-polyisoprene and the Functionalisation Thereof According to the Invention The synthesis process according to Example 5 was carried out by replacing the BEM with an excess amount of n-BuLi (20× equivalent Nd).

Example 7-1: Synthesis of Hydroxydiphenylmethylenyl-trans-polyisoprene and the Functionalisation Thereof According to the Invention The synthesis process according to Example 7 with $Nd(BH_4)_3(THF)_3$ (m=40.6 mg; n=0.1 mmol) and BEM (n=0.1 mmol; BEM/Nd=1) in 1 mL of toluene in the presence of isoprene (m=0.681 mg; V=1 mL; n=0.01 mol; isoprene/Nd=100) was used in implementation by replacing the BEM with n-BuLi (2 M in cyclohexane, V=0.25 mL; n=0.5 mmol) in an excess amount (5× equivalent Nd). 5 equivalents/Nd of benzophenone (m=91 mg, n=0.5 mmol) in 2 mL of THF ($V_{THF}=V_{Isoprene}$ $V_{Toluene}$; $[C]_{benzophenone}$=0.25 M) are added to the reaction mixture and then mixed for a period of 12 hrs at 50° C. The polymer is recovered according to the same protocol as in Example 1.

Example 7-2: Synthesis of Hydroxydiphenylmethylenyl-trans-polyisoprene and the Functionalisation Thereof According to the Invention The synthesis process according to Example 7-1 was carried out by replacing the n-BuLi with MeLi (1.6 M in $Et_2O$; V=0.32 mL; n=0.5 mmol) in an excess amount (5× equivalent Nd). The polymer is recovered according to the same protocol as in Example 1.

Example 7-3: Synthesis of Hydroxydiphenylmethylenyl-trans-polyisoprene and the Functionalisation Thereof According to the Invention The synthesis process according to Example 7 with $Nd(BH_4)_3(THF)_3$ (m=20.3 mg; n=0.05 mmol) and BEM (n=0.05 mmol; BEM/Nd=1) in 0.5 mL of toluene in the presence of isoprene (m=0.340 mg; V=0.5 mL; n=5 mmol; isoprene/Nd=100) was carried out by replacing the BEM with MeLi (1.6 M in $Et_2O$, V=0.16 mL, n=0.25 mmol) in an excess amount (5× equivalent Nd). 5 equivalents/Nd of benzophenone (m=45.5 mg, n=0.25 mmol) in 1 mL of THF ($V_{THF}=V_{Isoprene}$ $V_{Toluene}$; $[C]_{benzophenone}$=0.25 M) are added to the reaction mixture and then mixed for a period of 45 min at 50° C. The polymer is recovered according to the same protocol as in Example 1.

Example 7-4: Synthesis of Hydroxydiphenylmethylenyl-trans-polyisoprene and the Functionalisation Thereof According to the Invention The synthesis process according to Example 7-3 was carried out with reaction with the chain transfer agent (60 min) and with benzophenone (60 min) at ambient temperature. The polymer is recovered according to the same protocol as in Example 1.

Example 8: Synthesis of Hydroxydiphenylmethylenyl-trans-polyisoprene and the Functionalisation Thereof According to the Invention The synthesis process according to Example 7 was carried out with an isoprene/Nd molar ratio of 50.

Example 9: Synthesis of Hydroxydiphenylmethylenyl-trans-polymyrcene and the Functionalisation Thereof According to the Invention The synthesis process according to Example 7 was carried out by replacing isoprene with myrcene.

Example 10: Synthesis of Di(hydroxydiphenylmethylenyl)-trans-polyisoprene, in the Presence of a Bifunctional Alkylating Agent and the Functionalisation Thereof According to the Invention The synthesis process according to Example 7 was carried out with an isoprene/Nd molar ratio of 100 and with the catalytic system comprising of $Nd(BH_4)_3(THF)_3$/Mg(isoprenyl)$_n$ (Mg/Nd ratio=1).

The rate of conversion into monomer, the trans-1,4 stereo-regularity as well as the conversion rate were measured for each polydiene obtained according to Examples 1 to 10.

The results are summarised in Table 1 here below.

TABLE 1

| Examples | Transfer Agent in excess amt | Monomer/ Ln | Polymer Yield (%) | 1,4-trans (%) | Functionalisation rate (%) |
|---|---|---|---|---|---|
| 1 (Comparative) | — | 200 | 80 | 96.9 | 49 |
| 2 (Comparative) | — | 200 | 82 | 96.4 | 65 |
| 3 (Invention) | $AlEt_3$ | 1000 | 79 | 87.5 | 81 |
| 4 (Invention) | $Al(i-Bu)_3$ | 200 | 95 | >90 | >85 |
| 5 (Invention) | BEM | 200 | 76 | 96.2 | 89 |
| 6 (Invention) | BEM | 200 | 89 | 97 | 72 |
| 7 (Invention) | n-BuLi | 200 | 100 | 95.3 | 92 |
| 7-1 (Invention) | n-BuLi | 100 | >95 | 96 | 98 |
| 7-2 (Invention) | MeLi | 100 | >95 | 96 | 98 |
| 7-3 (Invention) | MeLi | 100 | 91 | 96 | 98 |
| 7-4 (Invention) | MeLi | 100 | 90 | 96 | 92 |
| 8 (Invention) | n-BuLi | 50 | 100 | 96.7 | 97 |
| 9 (Invention) | n-BuLi | 200 | 76 | >90 | 83 |
| 10 (Invention) | n-BuLi | 100 | 100 | 96.4 | 99 |

All of the syntheses carried out effectively served the purpose of obtaining trans-1,4 stereo-regular polydienes, in particular at a rate higher than 87%.

Advantageously exploiting the role as chain transfer agent of the excess aluminum compound during the process of polymerisation of the chains (Examples 3 and 4) made it possible to functionalise a large majority of the polydiene chains.

Thanks to the chain transfer step of transferring polymer chains to the magnesium or lithium once the polymerisation has ended (Examples 5 to 9), it has been possible to observe an even more effective functionalisation of the polydiene chains. This also provides the means to empirically demonstrate the living character of the polymerisation processes carried out.

Finally, the use in implementation of a bifunctional alkylating agent (Example 10) has made possible the synthesis of a telechelic stereo-regular polydiene presenting a functionalisation rate that is further enhanced.

In clear contrast, the synthesis processes based on Examples 1 and 2, that are not in accordance with the invention, do not serve to enable the obtaining of a satisfactory functionalisation rate for the polydienes obtained.

The invention claimed is:

1. A method for the end functionalisation of trans-1,4 stereo-regular polydiene chains obtained by coordination catalytic polymerisation of at least one conjugated diene monomer, wherein the said method comprises at least the following steps:
   a) providing a medium containing stereo-regular diene polymer chains formed in situ by means of coordination catalytic polymerisation of at least one conjugated diene monomer in the presence of a catalytic system that is effective in promoting trans-1,4 stereo-regular polymerisation of said monomer,
   b) introducing an excess amount of at least one metal transfer agent, brought in contact with said stereo-regular chains, and maintaining this contact under conditions conducive to the transfer thereof to said metal transfer agent, wherein the amount of the metal transfer agent is greater than the amount of polymerisation catalyst; and
   c) bringing the stereo-regular chains transferred to said metal transfer agent, into contact with at least one functionalising agent, and maintaining this contact under effective conditions conducive to the formation of a trans-1,4 stereo-regular diene polymer functionalised at least at one of its terminal ends,
   wherein the functionalised stereo-regular diene polymer obtained at the end of step c) has an end funtionalisation rate that is higher than 70%.

2. The method according to claim 1, wherein steps a) to c) are carried out in a continuous process.

3. The method according to claim 1, wherein the said functionalised stereo-regular diene polymer obtained at the end of step c) has an end functionalisation rate that is higher than 80%.

4. The method according to claim 1, wherein the coordination catalytic polymerisation is a coordinative chain transfer polymerisation process and the catalytic system comprises at least one metal catalyst and one alkylating agent.

5. The method according to claim 4, wherein the alkylating agent is selected from among dialkylmagnesiums, alkyllithiums and trialkylaluminiums; or is a bifunctional alkylating agent selected from among the compounds having the formula (MgIsoprenyl)$_n$, (MgButadienyl)$_n$, (MgMyrcenyl)$_n$; or is magnesium cyclopentane Mg $(CH_2)_5$.

6. The method according to claim 1, wherein the metal transfer agent is selected from among the dialkylmagnesiums, alkyllithiums and trialkylaluminums.

7. The method according to claim 4, wherein the metal transfer agent is identical to the alkylating agent and step b) is carried out consecutively to step a).

8. The method according to claim 4, wherein the alkylating agent is introduced in an excess amount from the start of the polymerisation in situ, and wherein the alkylating agent is a dialkylmagnesium and the metal transfer agent is a trialkylaluminum.

9. The method according to claim 1, wherein the functionalising agent is selected from among derivatives of carboxylic acids, ketones, aldehydes, esters, imidazolidinones, isocyanates, nitriles, epoxies, imines, amides, cyclic amines, siloxanes, phosphates, organosulfur compounds, dihalogens, carbamates, thiocarbamates, urea compounds, carbonates, lactones, carbon oxides and dioxygen.

10. The method according to claim 1, wherein the conjugated diene monomers are selected from among 1,3-butadiene; 2,3-di($C_1$-$C_5$ alkyl) 1,3-butadienes; substituted 1,3-butadienes; 1,3-hexadiene; 2,4-hexadiene; terpenes or any other conjugated diene comprising between 4 and 8 carbon atoms and the mixtures thereof.

11. The method according to claim 1, wherein the diene polymer chains considered in step a) have a high degree of trans-1,4 stereo-regularity that is higher than 85%.

12. The method according to claim 1, wherein the catalytic system of step a) comprises a rare earth catalyst/alkylating agent pair selected from among $Ln(BH_4)_3$ $(THF)_3$/BEM, $CpRLn(BH_4)_2(THF)_2$/BEM wherein CpR represents a cyclopentadienyl having the formula $C_5H_{5-a}R_a$ with an integer comprised between 0 and 5.

13. The method according to claim 1, wherein the diene polymer chains considered in step a) are polyisoprene chains; wherein the catalytic system used in the implementation of step a) comprises a catalyst $Nd(BH_4)_3(THF)_3$ combined with an alkylating agent butylethylmagnesium in a molar ratio in relation to neodymium that is equal to 1, and wherein the metal chain transfer agent used in the implementation of step b) is butylethylmagnesium, in a molar ratio in relation to neodymium that is at least equal to 5, or n-butyllithium in a molar ratio in relation to neodymium that is at least equal to 5, or methylllithium in a molar ratio in relation to neodymium that is at least equal to 5.

14. A polydiene having a trans-1,4 chain formation rate of at least 85%, and an end functionalisation rate that is higher than 70%.

15. The polydiene according to claim 14, derived from the coordination catalytic polymerisation of at least one conjugated diene monomer, substituted 1,3-butadienes, 1,3-hexadiene; 2,4-hexadiene; terpenes or any other conjugated diene comprising between 4 and 8 carbon atoms and the mixtures thereof, in particular isoprene, butadiene, myrcene, ocimene, farnesene and the mixtures thereof.

16. The polydiene according to claim 14, wherein the polydiene is a mono-functionalised or telechelic homo- or co-polydiene, in particular telechelic.

17. The polydiene according to claim 14, wherein the end functionalisation consists of a unit selected from among the carboxylic acid, aldehyde, carbonate, epoxy, alcohol, amine, nitrile, imine, amide, carbamate, thiocarbamate, hydroperoxide, phosphate, silanol, halide, and thiol groups.

18. The polydiene according to claim 14, wherein the polydiene is a homopolymer or co-polymer of isoprene, myrcene, butadiene, of oximene or farnesene mono-functionalised or telechelic at the terminal position.

19. The polydiene having a trans-1,4 chain formation rate of at least 85%, and an end functionalisation rate that is higher than 70%, wherein the polydiene is obtained in accordance with the functionalisation method according to claim 1.

* * * * *